United States Patent [19]

Speyer

[11] 3,854,962

[45] Dec. 17, 1974

[54] POLYHYDROXY FILLERS FOR PATTERN MATERIALS

[75] Inventor: Fred B. Speyer, Euclid, Ohio

[73] Assignee: TRW Inc., Cleveland, Ohio

[22] Filed: May 17, 1973

[21] Appl. No.: 361,247

Related U.S. Application Data

[63] Continuation of Ser. No. 250,492, May 5, 1972, abandoned.

[52] U.S. Cl............... 106/38.7, 106/38.6, 106/38.8, 106/219, 106/230, 106/268, 106/272
[51] Int. Cl............................ C08h 9/00, B28b 7/34
[58] Field of Search ....... 106/38.25, 38.8, 270, 272, 106/268, 15 FP, 38.7, 219, 230; 117/168

[56] References Cited
UNITED STATES PATENTS 2,722,557  11/1955  Danison .......................... 260/652.5
2,897,593  8/1959  Hollander et al. .................. 106/270
3,667,979  6/1972  Merges et al. ...................... 106/38.8

*Primary Examiner*—Lorenzo B. Hayes
*Attorney, Agent, or Firm*—Hill, Gross, Simpson, Van Santen, Steadman, Chiara & Simpson

[57] ABSTRACT

A pattern making composition for use in the manufacture of precision investment casting molds, the pattern composition containing one or more waxes and a combustible polyhydric alcohol having a melting point above the melting point of the wax to act as a filler for the pattern composition. The wax composition also preferably includes an organic acid to aid in suspending the polyhydric alcohol. The invention also is directed to the manufacture of precision investment casting molds using the improved pattern composition.

7 Claims, No Drawings ary satisfactory as a filler because of the difficulty in
POLYHYDROXY FILLERS FOR PATTERN MATERIALS This is a continuation, of application Ser. No. 250,492 filed 250,492, 5, 1972 now abandoned.

BACKGROUND OF THE INVENTION

1. Field of the Invention

This polyhydric is in the field of pattern compositions based on natural or synthetic waxes, or combinations of the two containing a filler consisting of a combustible polyhydric alcohol suspended in the wax melt, the polyhdric alcohol having a melting point above the melting point of the waxy materials present.

2. Description of the Prior Art

The so-called "lost wax" process for the manufacture of molds goes back hundreds and perhaps thousands of years. In its basic essentials, the process consists of forming a pattern of beeswax or other suitable wax material, forming a mold around the pattern and then melting out the wax leaving a mold whose molding cavity is an exact duplication of the original pattern.

The British publication entitled "PATTERN MATERIALS AND THEIR USE IN INVESTMENT CASTING" prepared by the B.I.C.T.A. Pattern-making Committee has set forth a summary of the physical properties of pattern materials which are required in modern day usage of the lost wax process. For one, the wax must be safe to handle as a solid and must not give rise to noxious fumes on melting or burning out. In addition, the wax should have a low ash content, on the order of 0.05 percent or so. Good oxidation resistance is required since the molten pattern wax tends to oxidize slowly in the air. Since modern day precision investment molds are built up on the pattern by means of successive dippings in suspensions containing refractory particles, the wax must also be resistant to any organic solvent or alkali which may be present in the dipping slurries. Another requirement, particularly where the patterns are formed by injection molding is that of quick setting. In addition, the plasticity or ductility of pattern waxes must be low at ambient temperatures so that patterns and assemblies do not sag under their own weight but at the same time, the pattern wax must not be brittle.

Another property which is highly desirable in a wax pattern is sufficient strength to be handled during molding operations, coupled with a certain degree of resilience, particularly in the areas of the sprues which must carry the weight of the patterns while the patterns are being dipped in the wet refractory slurries. Wax patterns must also be reasonably hard at room temperature so that the patterns can be handled throughout the assembly operations. They should evidence an ability to produce strong welds so that the assembly of the pattern clusters can be conveniently made.

The surface finish of the wax pattern must be good if faithful reproduction is to be achieved in the investment mold. Where a blend of materials is used as a wax pattern, the materials must be compatible with each other, i.e., they must dissolve in each other to the point where separation will not occur when the mixture is held within a given temperature range. The thermal characteristics of the wax are also important, particularly the viscosity at the optimum injection temperature, and the expansion-contraction characteristics. Low shrinkage is particularly important if a precise mold cavity is to be obtained from the pattern.

As a result of all these diverse requirements, modern pattern making has gone to combinations of various types of waxes, usually combined with resins such as wood rosin or synthetic resins.

There has been some work done along the lines of adding a combustible filler to the wax composition in order to reduce contraction. While this technique has met with some success, it has introduced some new problems. Carbon black, for example, is not particularly satisfactory as a filler because of the difficulty in handling finely divided particles (325 mesh or so). Polystyrene spheres may be used but they tend to coagulate in the molten wax at high melt temperatures. The use of urea has met with some success, but this material absorbs water and breaks down at elevated temperatures. Carbohydrates such as sucrose are limited in their applicability because they are affected by moisture. Organic acids such as adipic acid are sometimes satisfactory, but the acidity of these acids affects ceramic molds, and they tend to gum up in the molten wax at high temperatures.

Filled pattern melts are said to overcome the tendency to cavitation inherently present in a wax pattern, providing greater dimensional stability, reducing injection times up to 50 percent and eliminating the chills. It should be pointed out, however, that filled pattern compositions cause a problem in terms of recoverability, as the usual dewaxing techniques tend to sinter the filler material, rendering the recovery operation uneconomical.

With the foregoing background, it is apparent that the need still remains for an adequate filled wax pattern composition which has all of the desirable physical properties for pattern making and does not provide the usual disadvantages of other types of fillers presently in use. The satisfaction of that need is the principal object of the present invention.

SUMMARY OF THE INVENTION

The present invention provides an improved pattern making composition based on wax, and includes a combustible polyhydric alcohol which has a melting point above the melting point of the wax or waxes present so that it retains its particulate identity throughout the injection of the pattern material into the dies. The wax normally consists of a blend of various types of waxes and constitutes at least 40 percent by weight and preferably from 50 to 95 percent by weight of the final composition. A fatty acid containing 12 to 22 carbon atoms per molecule is also preferably included. The fatty acid of which stearic acid is the preferred example, is present in the range of 1 to 25 percent by weight and preferably in the range of 5 to 15 percent. The polyhydric alcohol, of which pentaerythritol is the preferred example, is present in amounts of from 5 to 50 percent by weight and preferably in amounts of 5 to 20% by weight.

DESCRIPTION OF THE PREFERRED EMBODIMENTS

It has been estimated that there are hundreds of materials from which it may be possible to prepare blends suitable for use as pattern waxes. One of the most commonly used classes of waxes for this purpose consists of petroleum waxes, such as paraffin wax. These are crystalline, medium soft, sharp melting, non-adhesive, low viscosity waxes. These waxes are available in a series of grades differing in melting points by a few degrees.

Another type of wax petroleum origin which can be used is a microcrystalline wax. This type of wax is available in a variety of melting points and solidification temperature ranges. There are also available modified microcrystalline waxes which have been partially oxidized to alter their properties. Other microcrystalline waxes include blends of unmodified microcrystalline and polymerized microcrystalline waxes.

Another important class of waxes is that of mineral waxes of which Montan wax is probably the most important. This is a hard material containing a resin and is rather brittle. This type of wax is less expensive than vegetable waxes and yet has properties similar in many ways to those of the vegetable waxes except that it possesses a higher viscosity. Peat wax which is produced by extracting peat with an organic solvent is another example of mineral wax which can be used in pattern making compositions. Ozokerite, which is a resinous type of wax extracted from shale, is still another type of mineral wax which can be used.

Turning to the natural waxes and resins, there is beeswax and numerous vegetable waxes, the best known of which are carnauba and candellilla. Carnauba wax is a very hard wax with a small dross and moisture content. Candellilla wax contains a trace of a resin, but is not as hard and does not possess as high a melting point as carnauba wax. Still other vegetable waxes which can be used are esparto wax, gum rosin and gum damar which is a simple vegetable exudate from the East Indies.

The next major class of waxes is the modified and synthetic waxes. Modified waxes are produced from natural waxes which have been modified by oxidation or treatment with some reactant to produce waxes which are harder, more saponifiable or more emulsifiable. Synthetic waxes include materials such as hydrogenated fats, wax-like esters and ketones and long chain polymers of ethylene or ethylene oxide. Other examples of the synthetic waxes are the amide type waxes and ester amide waxes which are obtained by reacting fatty acids with 12 or more carbon atoms with polyamines or hydroxy compounds.

Still other synthetic type waxes include materials such as synthetic resin derivatives of natural rosin such as the hydrogenated, polymerized or esterified derivatives. Esters produced by reacting rosin with glycerine and ethylene glycol have good adhesiveness, low surface tension, good oxidation resistance and low expansion characteristics. Terpene resins derived from coniferous trees form still another useful class of resins.

The selection of particular wax blends is usually dictated by the injection temperature desired, and the physical properties which are to be achieved in the wax pattern. Consequently, the melting points of the blends may vary substantially, inasmuch as the melting points of natural waxes range from about 50°C. to 95°C., while the synthetic waxes have melting points extending from about 35°C. to 200°C.

While fatty acids can themselves be considered waxes, the compositions of the present invention include such fatty acids not only for their physical properties but because they act as suspending agents for the polyhydric alcohol. The use of the polyhydric alcohol makes it possible to obtain an ionic suspension rather than a particulate filled melt wholly dependent upon continuous agitation for suspension. Apparently, an electronegative attraction exists between the carboxyl groups contained in the fatty acid and the hydroxyl groups of the alcohol. Thus, the melt filled with the polyhydric alcohol maintains a homogeneous suspension. While many different types of fatty acids can be used, ranging from 12 carbon to 22 carbon atom acids, stearic acid is preferred broadly in amounts of 1 to 25 percent by weight of the entire composition, and preferably from 5 to 15 percent by weight. While fatty acids are preferred because they have wax-like properties of their own, it is possible to employ other organic acids such as butyric, caproic, or valeric in the melt strictly as suspension promoting agents, provided they are otherwise compatible with the waxy materials and are added in sufficiently small quantities so as not to affect the rheological properties of the melt adversely.

The improved results obtained with the wax materials of the present invention are mostly attributable to the presence of the polyhydric alcohol. A wide variety of polyhydric alcohols can be used, depending upon the melting point of the remainder of the composition. The polyhydric alcohol should be one whose melting point is significantly above the melting point of the waxy materials so that the finely divided particles of the polyhydric alcohol (325 mesh or less) will remaian suspended in the melt at the particular injection temperature used for forming the pattern.

Listed below are some of the high melting point organic poly-hydric alcohols which can be used for the purposes of the present invention:

Pentaerythritol
Dipentaerythritol
1,10 decanediol
1,14 tetradecanediol
1,15 pentadecanediol
1,16 hexadecanediol
1,18 octadecanediol
1,19 nonadecanediol
1,20 eicosanediol Pentaerythritol in an amount of from 5 to 50 percent by weight and preferably from 5 to 20 percent by weight of the entire composition is particularly preferred. This material is relatively inexpensive and is non-corrosive to the ceramic molds. It can be readily suspended into the hot melt at temperatures up to 135°C. or more without being solvated by the melt. This permits any moisture introduced by the filler addition to be dissipated during the melt cool down cycle. Consequently, preconditioning the filler by demoisturizing the same is eliminated. It also permits deaeration at elevated temperatures. Because the pentaerythritol does not readily solvate into wax-type melts, it can be kept at elevated temperatures without gumming up such as organic acids would do. The physical properties of the molded patterns containing pentaerythritol are in all respects comparable to those containing adipic acid. In addition, molded patterns containing pentaerythritol have an improved surface finish.

Tests were made to compare the new compositions with pattern compositions containing adipic acid. The adipic acid containing composition was as follows:

"Piccolyte S-135"
(beta terpene resin) 31.25 percent/w
"Mobile 150"
(paraffin wax) 12.50 percent/w
"Amperol 8"
(microcrystalline wax) 12.50 percent/w Candelilla wax 6.25 percent/w
"Hystrene 8018"
(fatty acids, 80 percent stearic) 12.50 percent/w
Adipic acid 25.00 percent/w The same formulation was made up using pentaerythritol in place of adipic acid, in the same amount.

The formulation was made up by first melting the fatty acid and the microcrystalline wax. When the temperature reached 121°C., the resin was slowly added, maintaining constant agitation. By the time the temperature reached 177°C., all of the resin was in solution. The heat was reduced and the paraffin wax was added. When the melt reached about 99°C., the candellilla wax was added. The filler, whether adipic acid or pentaerythritol, was added when the melt reached about 93°C., and the material slabbed off between 71 and 82°C.

The pattern compositions were injected through a standard injection molding pattern making machine and then the resulting patterns were tested for physical properties, with the following results:

| Test | Adipic acid filler | Pentaerythritol filler |
| --- | --- | --- |
| Deflection under load, inches | 0.015 | 0.012 |
| Sag without load, in. | 0.020 | 0.015 |
| Impact, drop height, in. | 3.0 | 3.5 |
| Stress rupture, lbs. | 14.0 | 13.8 |

The surface finish of the patterns containing the pentaerythritol filler was found to be superior to those containing the adipic acid filler.

Patterns produced according to the present invention can be used in the normal precision investment mold making process to produce porous ceramic shell molds. One such method involves coating the pattern by dipping it in an aqueous ceramic slurry having a temperature about the same as that of the pattern to form a refractory layer of a few mils in thickness. A typical slurry may contain ceramic material such as zirconium oxide, a binder such as colloidal silica, and a thickener and low temperature binder such as methyl cellulose. The initial layer while still wet is then dusted with small particles (40 to 200 mesh) of a refractory glass composition such as that known as "Vycor" which is a finely divided, high silicon oxide glass containing about 98 percent silica and a small amount of boric acid, together with traces of aluminum, sodium, iron and arsenic. The pattern with the dusted, wet refractory layer on it is then suspended on a conveyor and moved to a drying oven having a controlled humidity and temperature, thereby drying the coated pattern adiabatically.

The steps of dipping, dusting and adiabatic drying are then repeated using air at progressively lower humidities for succeeding coats. For example, the first two coats can be dried with air having a relative humidity of 45 to 55 percent. The third and fourth coats can be dried with a relative humidity of 35 to 45 percent, the fifth and sixth coats with a relative humidity of 25 to 30 percent, and the final coat with a relative humidity of 15 to 25 percent.

The first layer is preferably applied to a thickness of 0.005 to 0.020 inch, and the fine refractory particles are dusted onto the wet layer with sufficient force to embed the particles therein. It is preferred that the dusting procedure used provide a dense uniform cloud of fine particles that strike the wet coating with substantial impact force. The force should not be so great, however, as to break or knock off the wet prime layer from the pattern. This process is repeated until a plurality of integrated layers is obtained, the thickness of the layers each being from about 0.005 to 0.020 inch.

After the mold is built up on the pattern material, the pattern can be removed by heat and then the green mold is ready for firing. Generally, firing temperatures on the order of 1500° to 1900°F. are used. The resulting shell molds are hard, smooth and relatively permeable and measure on the order of ⅛ to ¼ inch in thickness.

It should be evident that various modifications can be made to the described embodiments without departing from the scope of the present invention.

I claim as my invention:

1. In a pattern composition for producing investment casting molds, said pattern composition evidencing good oxidation resistance, being devoid of noxious fumes on melting, having quick setting properties, having low ductility, and having low shrinkage properties, said pattern consisting essentially of a natural wax, a synthetic wax, or a mixture thereof in an amount of at least 40 percent by weight, a fatty acid containing from 12 to 22 carbon atoms per molecule in an amount of 1 to 25 percent by weight and a filler; the improvement comprising, as said filler, a polyhydric alcohol having a melting point above the melting point of said wax in an amount of from 5 to 50 percent by weight.

2. The composition of claim 1 in which said polyhydric alcohol is pentaerythritol.

3. The composition of claim 1 in which said wax constitutes from 50 to 95 percent by weight of the composition.

4. The composition of claim 1 in which said fatty acid constitutes from 5 to 15 percent by weight of the composition.

5. The composition of claim 1 in which said polyhydric alcohol constitutes from 5 to 20 percent by weight of the composition.

6. The composition of claim 1 in which said fatty acid is stearic acid and said polyhydric alcohol is pentaerythritol.

7. In the method of forming an investment casting mold in which a shell is built up on a pattern by successive applications of layers of refractory particles, the pattern is removed, and the shell is fired at an elevated temperature, the improvement which comprises forming the pattern from the pattern composition of claim 1.

* * * * *